Figures 1, 2, 3, 4, 5, 6:
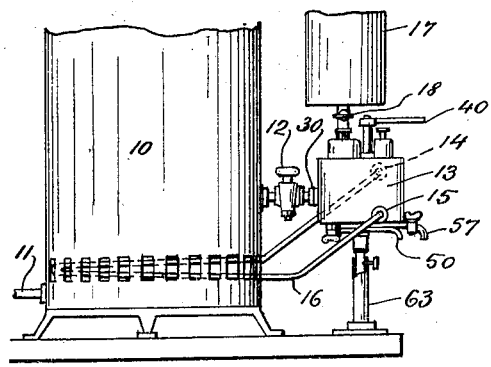

Aug. 27, 1929.  B. PAPADOPOULOS  1,725,930
DISPENSING DEVICE
Filed March 17, 1928

INVENTOR
Basil Papadopoulos
BY
ATTORNEY

Patented Aug. 27, 1929.

1,725,930

UNITED STATES PATENT OFFICE.

BASIL PAPADOPOULOS, OF BROOKLYN, NEW YORK.

DISPENSING DEVICE.

Application filed March 17, 1928. Serial No. 262,366.

This invention relates to dispensing devices for liquids.

One of its objects is to provide a simple, inexpensive attachment adapted to be associated with existing dispensing devices for liquids, which will facilitate measuring and mixing of two or more originally separated liquids at predetermined quantities.

Another object of this invention is to provide in connection with such device, means for keeping the liquids at a desired temperature during the periods of measuring, mixing and dispensing them.

Another object of my invention is to provide means for independently discharging one kind of liquid without passing it through the measuring means of the device.

The foregoing and further objects will be more fully apparent from the following description and the accompanying drawings, forming part of this disclosure, which, however, are not intended to limit it to the actual showing.

In the drawings, Figure 1 denotes a side elevation of my device, seen connected with an existing liquid dispensing source, Figure 2 illustrates a top view of my device with some of its parts removed, Figure 3 is an elevation of my device, partially in section, Figure 4 is a detail cross sectional view through the valve casing of my device, Figure 5 is a top view of the valve casing, and Figure 6 illustrates various cross sections, taken through the key of my device.

Referring to the figures, numeral 10 denotes a coffee urn, which is connected by means of pipe 11 with a gas supply for heating the urn. A common cock 12 connects the coffee urn with my device, which consists of an outer housing 13, within which the rest of the apparatus is contained.

Housing 13 has one upper outlet 14 and one lower outlet 15 which outlets connect with a pipe 16, which leads into the heating space of the urn. The housing 13 is filled with water, which is heated by the flame heating the urn. The water circulates through pipe 16 and keeps the water at a desired temperature so that all apparatus within the housing are kept warm.

In Figure 1 there will be seen arranged above my device a milk container 17, controlled by cock 18. This milk container connects with a depression 19, clearly seen in Figures 2 and 4.

Within the housing there will be seen two groups of measuring containers, each composed of large containers 20 and 21 and smaller containers 22 and 23. Arranged between the container groups, and connecting all containers together, is a valve casing, indicated at 24. In its enlarged portion there is provided a key seat 25, and at its reduced end there is seen a cleaning passage 26, closed by screw 27.

Referring to Figure 4 it will be seen that cleaning passage 26 connects, by means of reduced passage 28, with a threaded inlet 29, adapted to connect through a nipple 30 (seen in Figures 1 and 2) with cock 12 (in Figure 1). Next to threaded hole 29 there is an enlargement 31, terminating in a vertical threaded hole, which receives an auxiliary valve housing 32 (Figure 4).

This valve housing is provided with a valve spindle 33, having a cone 34, which is operated by wing nut 35, from without. The hollow space in which the spindle operates has an opening connecting with an outlet pipe 36. Opening 29, and passages 28 and 26, connect with lower intake passage 37. Depression 19 connects with upper intake passage 38.

Within the valve seat 25 there is operatively mounted key 39, the construction of which is clearly seen in Figure 4. This key is provided with a handle 40, by means of which it may be operated by turning it within ninety degrees from left to right or from right to left. Key 39 is provided with upper annular ports 41 and 42, connecting, respectively, with intake passages 38 and 37.

A cross section through those ports is shown in Figure 6. The first section, indicated by I, shows a cross sectional view, taken on line I of Figure 4, and illustrates port 41. II indicates a cross section through port 42. The lower portion of the key is hollow, as indicated at 43. Its hollow portion connects with its lower ports 44 and 45.

As will be clearly seen in Figure 6, the upper ports are at right angles to the lower ports. Disposed within the hollow portion of key 39, there will be seen a threaded rod 46, which serves as adjusting and securing means for the key, as may be clearly seen in Figure 3.

The part of the valve casing in which the key seat 25 is provided, extends beyond the body of the valve casing into a threaded extension 47, which is adapted to pass through the bottom of housing 13, and is made water tight by a plurality of washers 48, and held in place by means of nut 49, which engages the threaded portion 47. In this extension 47 there is provided a threaded aperture, in which is placed a discharge pipe 50.

Each of the measuring containers is provided with two holes, one above the other. Corresponding to the openings in the containers, there are provided in the valve casing, upper liquid conveying passages 51 and 52, terminating in valve seat 25.

Below the conveying passages, and also provided within the valve casing, there are discharge passages 53 and 54, also connecting with the valve seat but at a lower level. The upper passages 51 and 52 make connections, by means of port 41 of the key, between the milk container and the small measuring containers 22 and 23. The lower passages 53 and 54 connect, by means of port 42 of the key, the coffee urn with the large measuring containers 20 and 21.

Below these conveying passages, there are provided discharge passages connecting the respective measuring containers with the lower portion of the key 39, which is hollow. These discharge passages are not shown, however, they may be easily pictured to connect with ports 44 and 45 of the key. The movement of the key is limited by two pins 55, arranged within the casing, and a pin 56 associated with the key itself. This is clearly seen in Figure 5.

Pipe 36 connecting with the auxiliary valve casing 32, terminates in a stop cock 57, through which coffee may be directly dispensed without entering the measuring container. Each of the containers is provided with volume controlling device comprising a cylinder as shown in Figure 3. This volume controlling device consists of an inner cylinder 58, which is adjustably mounted below cover 59, and may be operated by means of a threaded spindle 60, terminating in a knob 61. By adjusting the position of cylinder 58 within the measuring container, the quantity of liquid entering thereinto is determined.

Any convenient means for preventing the formation of pressure and vacuum within the container while liquid is either entered or discharged from the container, may be provided, as shown for example, at 62, but any other means may be employed to accomplish the same results.

The entire device is so arranged as to be readily attachable to an existing urn, and in order to support its weight and prevent it from injuring the coffee urn, an adjustable stand, indicated at 63, is provided.

*Operation.*

When it is desired to dispense a predetermined quantity of coffee mixed with a predetermined quantity of milk, handle 40 of the key is worked, for example, to its left hand position. At this moment, connection is made between intake passage 38, conveying milk and intake passage 37, conveying coffee, to right hand measuring container 23 and right hand measuring container 21, respectively.

The next operation consists in reversing the position of the key, at which moment connection is made between passages 38 and 37 and containers 22 and 20, respectively. At the same time, connection is made between containers 21 and 23 through ports 44 and 45, into the hollow space 43 of the key. In this space the coffee and milk is mixed, and the mixed liquid is conveyed through pipe 50 to a receptacle placed thereunder.

When reversing the operation, the left hand group of containers is emptied in the same manner through ports 44 and 45, while the right hand measuring containers are filled with the respective liquids.

In the event it is desired that coffee alone be drawn from the urn, wing nut 35 is turned upwards until the cone 34 closes the reduced passage 28, thereby preventing coffee from entering into intake passage 37, or rather, preventing it from discharging from that passage, while at the same time a direct connection is made between the urn and pipe 36, controlled by faucet or cock 57. Now this cock is opened and the coffee is discharged directly into a container held below.

As will be seen from the description of Figure 3, the measuring containers are readily adjustable for different quantities of coffee and milk to be dispensed, and this adjustment may be made from without, and without otherwise altering the operation of the device.

While I have shown and explained a specific form of my invention, be it understood that variations and improvements may be made without departing from the broad scope of my invention, for which I claim:

1. A device for measuring, mixing and dispensing a plurality of liquids, adapted to be associated with existing liquid supply devices, comprising a heating chamber adapted to receive a heating fluid, means associated with said chamber for circulating such fluid therein and keeping it at a desired temperature, a double group of measuring containers placed within said chamber, each of said containers adapted to receive individually a predetermined quantity of one kind of liquid at one time, a volume controlling device associated with each of said containers, means for adjusting said controlling device from without, a valve casing disposed between and connecting said container groups, a key, provided with a plurality of upper and lower ports, operatively associated with said casing and adapted to facilitate the alternate filling of one and emptying of the other group of containers, said valve casing provided with a plurality of intake passages connecting the liquid supply devices with the upper ports of the key, conveying passages connecting said upper ports with said containers, discharge passages connecting said containers with the lower ports of said key, the latter having at its lower end a hollow outlet connecting with its lower ports and forming a mixing chamber for the individually discharged liquids flowing from said containers, said key ports being so arranged that when the key is placed into one position, one group of the key ports facilitates the filling of one group of containers, while the other group of key ports facilitates emptying the other group of containers, and when said key is turned to another position the filling and emptying of said container groups is reversed, a liquid diverting valve connected with and arranged at the bottom of said valve casing and intercepting one of the intake passages connected with one of said supply devices, said valve comprising a hollow body, a valve spindle in said body, operable from without and adapted to intercept and close part of said intake passage connecting with said measuring containers, a pipe connecting with said hollow body and terminating in a cock and serving for conveying liquid directly from said supply device, and an adjustable support associated with said heating chamber and serving for supporting the weight of the device.

2. A device for measuring, mixing and dispensing a plurality of liquids, adapted to be associated with existing liquid supply devices, comprising a heating chamber adapted to receive a heating fluid, means associated with said chamber for circulating such fluid therein and keeping it at a desired temperature, a double group of measuring containers placed within said chamber, each of said containers adapted to receive individually a predetermined quantity of one kind of liquid at one time, a volume controlling device associated with each of said containers, means for adjusting said controlling device from without, a valve casing disposed between and connecting said container groups, a key provided with a plurality of port groups, operatively associated with said casing and adapted to facilitate the alternate filling of one and emptying of the other group of containers, said valve casing provided with a plurality of intake passages connecting the liquid supply devices with one port group of the key, conveying passages connecting said one port group with said containers, discharge passages connecting said containers with another port group of said key, the latter having a hollow outlet connecting with said other port group and forming a mixing chamber for the individually discharged liquids flowing from said containers, said key ports being so arranged that when the key is placed into one position, one group of the key ports facilitates the filling of one group of containers, while the other group of key ports facilitates emptying the other group of containers, and when said key is turned to another position the filling and emptying of said container groups is reversed, a liquid diverting valve connected with and intercepting the intake passages leading from one of said supply devices to said measuring containers and operable from without and adapted to close said intake passage in respect to said measuring containers, and further adapted to facilitate direct discharge from said supply device, and means for controlling such direct discharge from the latter.

Signed at New York in the county of New York and State of New York this 15th day of March, A. D. 1928.

BASIL PAPADOPOULOS.